United States Patent [19]

Weiner

[11] 4,210,196
[45] Jul. 1, 1980

[54] DIE CASTING APPARATUS

[76] Inventor: Lewis Weiner, 87-08 Santiago St., Holliswood, N.Y. 11423

[21] Appl. No.: 911,384

[22] Filed: Jun. 1, 1978

[51] Int. Cl.² .................... B22D 17/16; B22D 17/24; B22D 17/26
[52] U.S. Cl. .................................. 164/152; 164/303; 164/316; 164/339; 164/340; 164/341; 164/342; 164/343; 164/344; 425/330; 425/DIG. 5; 425/589
[58] Field of Search ............... 164/303, 306, 312, 339, 164/340, 341, 342, 343, 345, 155, 344, 152; 425/330, DIG. 5, 589

[56] References Cited

U.S. PATENT DOCUMENTS

| | | | |
|---|---|---|---|
| 1,431,089 | 10/1922 | Barkschat | 164/340 X |
| 1,967,196 | 7/1934 | Weiner | 164/340 |
| 2,512,535 | 6/1950 | Wiltshire et al. | 164/344 X |
| 2,811,758 | 11/1957 | Holmes et al. | 164/155 X |
| 3,266,100 | 8/1966 | Belanger | 425/DIG. 5 |
| 3,596,708 | 8/1971 | Lapin | 164/312 |
| 3,727,674 | 4/1973 | Chatourel et al. | 164/306 |

FOREIGN PATENT DOCUMENTS

| | | | |
|---|---|---|---|
| 594805 | 6/1959 | Italy | 425/DIG. 5 |
| 510668 | 8/1939 | United Kingdom | 164/345 |

*Primary Examiner*—Robert D. Baldwin
*Assistant Examiner*—Gus T. Hampilos
*Attorney, Agent, or Firm*—Watson, Leavenworth, Kelton & Taggart

[57] ABSTRACT

A die casting unit employing plural die members and core members which are used in closed position for die casting shaped articles of unusual configuration and particularly articles which are comprised of two or more subcomponents arranged or joined in interconnected assembly, an example of such shaped article being the slider body and pull chain used on slide fasteners. Movement of at least the die members during the molding cycle is effected by rotation of a ring member carrying structure which cooperates with structure on the die members to slide the die members between their open and closed positions.

26 Claims, 11 Drawing Figures

DIE CASTING APPARATUS

BACKGROUND OF THE INVENTION

It is known to form various types of shaped articles in a die casting operation and for which purpose, various types of die casting apparatus are used. However, such die casting operations are limited as to the geometry of the articles which can be cast therewith, principally, because known apparatus is limited to use at most of two die members and two or three cores or alternatively use of four die members without use of cores. Multiple dies, that is dies having more than one cavity, also can be used but still they are not satisfactory for producing shaped articles wherein the articles may comprise two or more structurally separate elements but which elements are interconnected. One illustration of the type of article which cannot be shaped in known die casting processes is a slider for a slide fastening and to which slider is attached a pull chain. Such casting processes and apparatus can not be used for forming the interconnected slider body and pull chain in a single casting operation.

Moreover, prior processes and apparatus generally involve use of cumbersome space-taking structure to move the die members between open and closed positions.

SUMMARY OF THE INVENTION

The present invention is concerned with apparatus which can be used for die casting shaped articles. Such shaped articles can follow a wide range as to type and shape and in particular involves the making of articles which have two or more subcomponents arranged in interconnected assembly. While the present invention has a wide range of utilization for die casting articles such as certain electric and plumbing components, clothing buttons and the like, the invention will be described by way of example in relation to its use for die casting slide fastener slider bodies with interconnected pull chain components. In particular embodiments it is described as including the use of plural die and plural core elements. However, in its broader reach the invention will be understood as involving the use of various combinations of dies and cores depending on the type and shape of article being cast. Thus, the apparatus might include 2,3 or 4 dies with no cores, or 2,3 or 4 dies with 1 or 2 or even 3 cores.

In accordance with the present invention, the apparatus in one embodiment includes a molten metal supply means which can be of known construction and which includes a pot in which molten metal such as a zinc alloy is present, a piston for expelling molten metal from the pot through a passage having outlet in a gooseneck and such gooseneck communcating directly with the die molding surfaces or cavity in which the article is shaped. The apparatus also includes a mounting frame which is connected with the molten pot structure and which carries a ring member rotatably mounted in such frame for rotation about a fixed axis. Die means and core means, desirably four die members and two core members, also are mounted on the mounting frame for sliding travel between open and closed positions, the die members and core members in closed position defining the actual molding cavity to which molten meta is delivered for forming the articles. The travel of the respective die members and core members is generally radially of a fixed axis centrally disposed of the mounting frame and ring member. The ring member carries a number of camming blocks which are bolted or otherwise removably fixed to the ring member and for which purpose the ring member is provided with a series or plurality of openings extending circularly thereof for receiving bolt or like fastening means and selectively positioning or locating the camming blocks on the ring member. By such arrangement, the camming blocks associated one with each of the respective core members and die members can be positioned to control the sequence and timing of the opening and closing of the core and die members upon establishment of relative rotation between the mounting frame and ring member. Each of the core and die members has fixed thereto a cam follower which rides against the camming surfaces of the respective camming blocks, camming tracks being preferred as such camming surfaces. Additionally, means can be provided for adjusting the throw of the respective core and die members, that is the stroke in which they are moved between open and closed positions, such adjustments being particularly advantageous for setting up the assembly for die casting operations.

For effecting rotation between the mounting frame and ring member, the ring member can be provided with a radially directed lever arm which in turn is connected to the piston rod of an air cylinder unit, the ring member thereby being oscillated to effect opening and closing of the core members if desired, the core membes as well for each cycle of oscillation thereof.

The apparatus also includes an inner ring member fixed to the mounting frame and against which the outer or first-mentioned ring rides to thereby function as a bearing surface for the same.

Further features of the invention provide that there be suitable cooling passages provided under the inner ring member and in the core and die members to effect cooling thereof.

In a particularly desirable form, the outlet of the molten metal supply means is moved toward and away from the mounting frame by the action of an air or fluid actuated cylinder unit which action places the inlet to the cavity defined by the die and core members in contact with such delivery passage outlet once each cycle of operation of the apparatus.

Other features of the invention include means for applying a lubricating fluid to the surface of the outer ring member wherein the same rides in a grooved track formed in the mounting frame structure.

As indicated above, the invention has particulaar application in forming shpaed articles comprising two or more subelements which are interconnected, as for example, a slide fastener slider body and a pull chain. In such form, four die members and two core members are used, the die members desirably being disposed at 90° circular spacing one from the others about the fixed axis with the core members being disposed intervening adjacent ones of the die members and advantageously at reciprocal or diametrically opposed locations respective of the fixed axis.

While conveniently, the core members can in addition to the die members be moved between open and closed positions by utilization of camming blocks on the ring member, the function of opening and closing such components could be effected in other ways. For example, the ring member and camming block arrangement could be employed to move the die members between their respective open and closed positions, whereas one or even both of the core members could be actuated by other means such as air or other fluid actuated cylinder units. As those skilled in the art will appreciate, any combination of camming block actuating means or air cylinder actuating means could be used with the core members.

A further embodiment of the invention provides that the apparatus can be used for forming shaped articles which have internally threaded passages therein or externally threaded surfaces thereon. In such instance, a further core means, for example, a third core carried on the end of a piston rod would be employed and would be adapted for movement along the fixed axis. In such construction, the sliding movement between open and closed positions of the core would be effected by means of an air cylinder unit. However, since the core is employed for defining a threaded passage within the die structure or an external threaded surface, it is also necessary to rotate the core member particularly when it is being withdrawn from its closed position. For this purpose a gear, e.g., a spur gear is mounted rotatably on the piston rod of the air cylinder and is in mesh with a companion driver gear adjacent the air cylinder unit and operated by means of an electric motor, the core being fixed to the spur gear. Thus, while the first gear is being moved in the direction of the long axis, it will also slide along the driving gear which has greater depth teeth thereon so that rotational movement can be concurrently imparted to the air cylinder piston rod.

DESCRIPTION OF THE DRAWINGS

Other objects of the invention will in part be obvious and will in part appear from the following detailed description taken in connection with the accompanying drawings, wherein like reference numerals identify like parts throughout, and in which.

DESCRIPTION OF THE PREFERRED EMBODIMENTS

Figure 4:
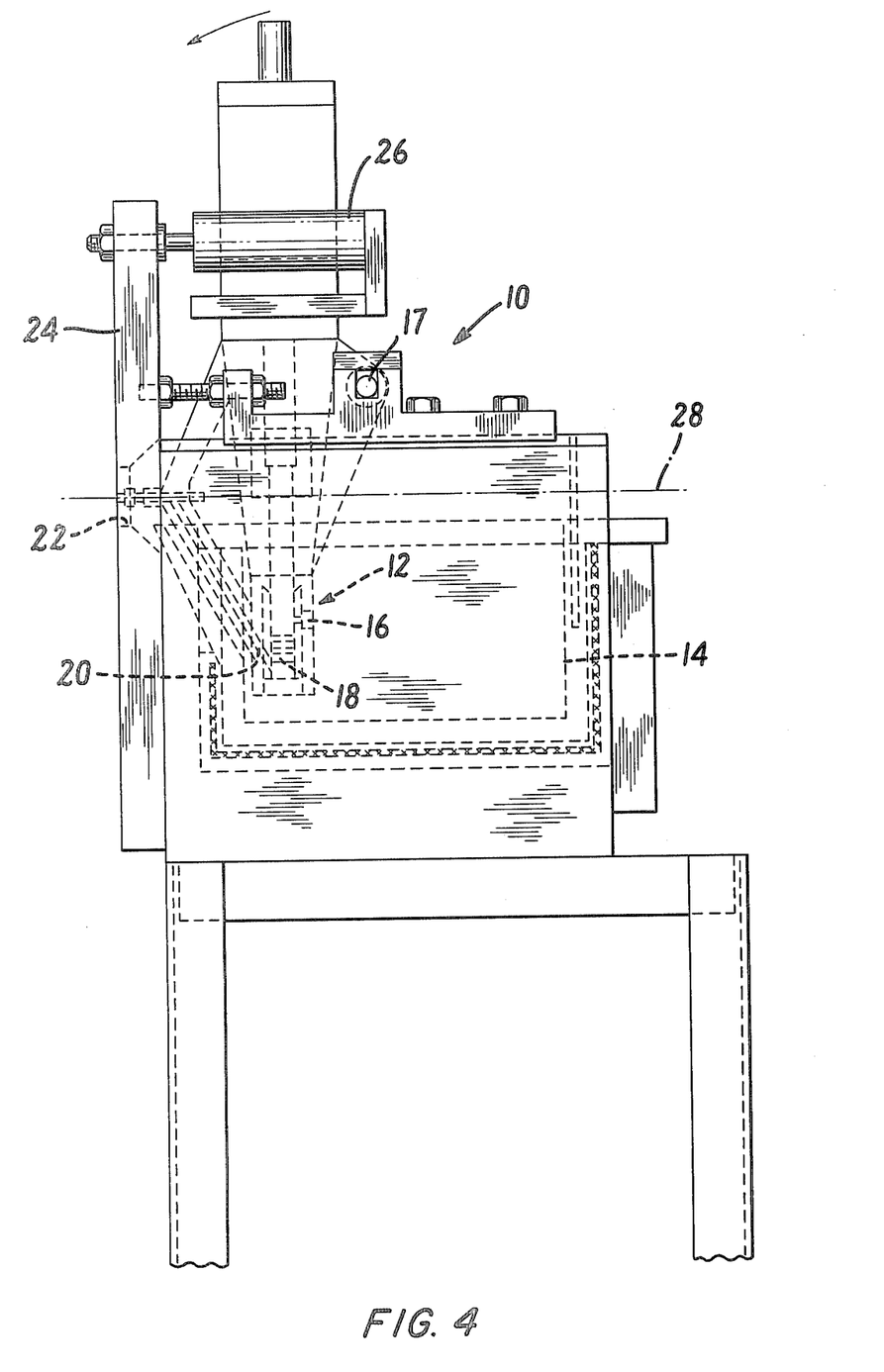
FIG. 4 depicts in side elevational view, a type of casting machine used with the appratus of the present invention showing in particular the molten metal pot, piston and gooseneck fo delivering molten metal to the outlet, and also the means by which gooseneck is moved toward and away from the mounting frame of the apparatus.

Referring now to FIG 4 of the drawings, there is shown generally at 10 apparatus for die casting shaped articles in accordance with the present invention, certain of the components of the invention not being depicted. In general, the FIG. 4 apparatus 10 includes gooseneck 12 of conventional construction, submerged in an insulated pot 14 containing molten metal alloy. A piston 18 operates in the gooseneck, the piston being employed for withdrawing molten metal from the pot and through an opening for delivery through passage 20 to an outlet at die gooseneck 22 in known manner. The apparatus also comprises a mounting frame 24 on which is received the specific components of the present invention, the mounting frame including an extension of the outlet from whence issues the molten metal such outlet being in direct sealed communication with the inlet to the cavity formed by the die and core members to be described shortly. The gooseneck unit 12, it will be noted, is adapted to be stroked toward and away from the die and core members when same are closed by means of an air cylinder unit 26, such strocking occurring counterclockwise and down from the core and die members and about pivot 17 when the core and die members are opened and clockwise and up when the core and die members are closed.

Figure 1:
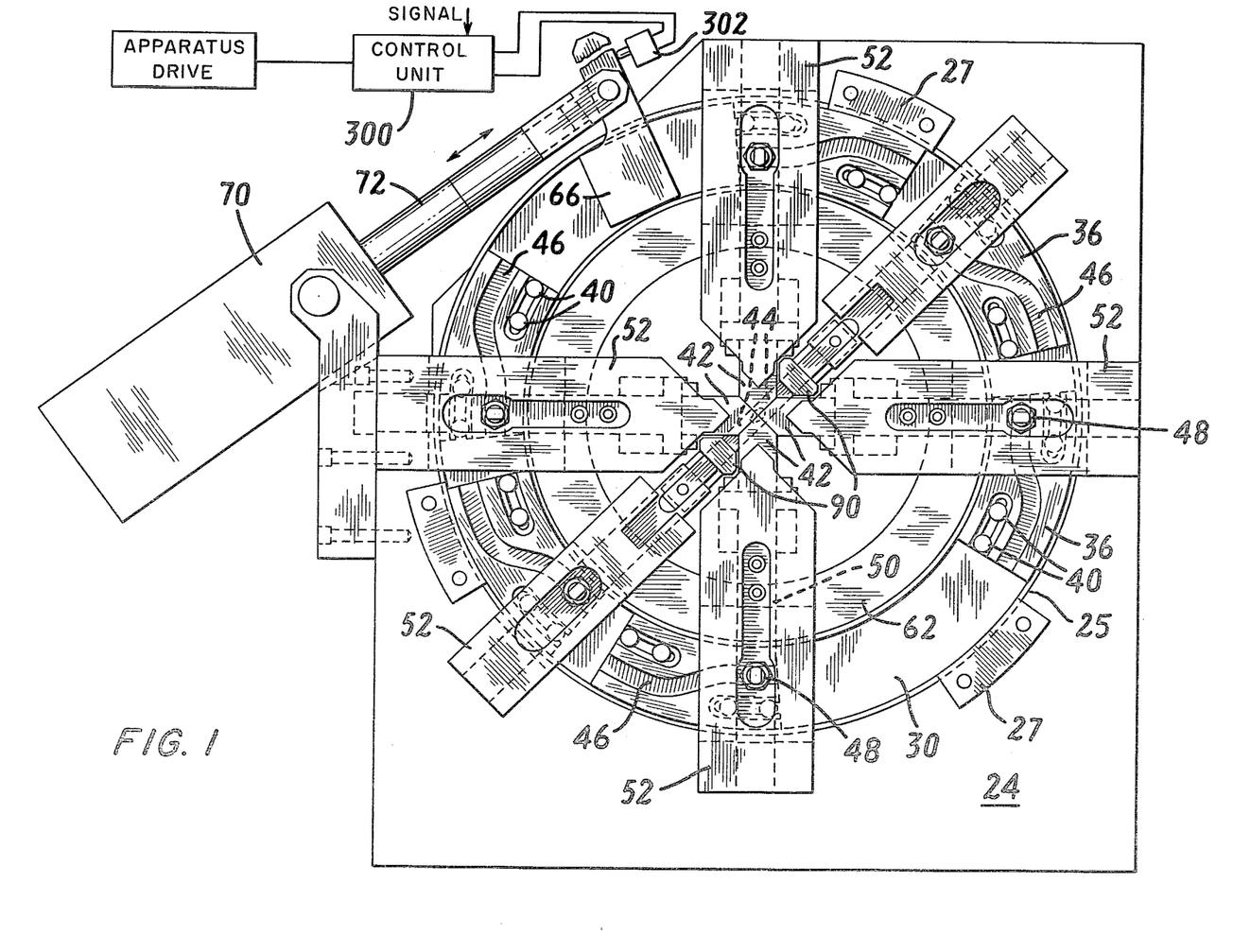
FIG. 1 is a front elevational view of the casting station part of the apparatus of the invention looking in the direction of the fixed axis, the core members and die members being in closed position.
Figure 2:
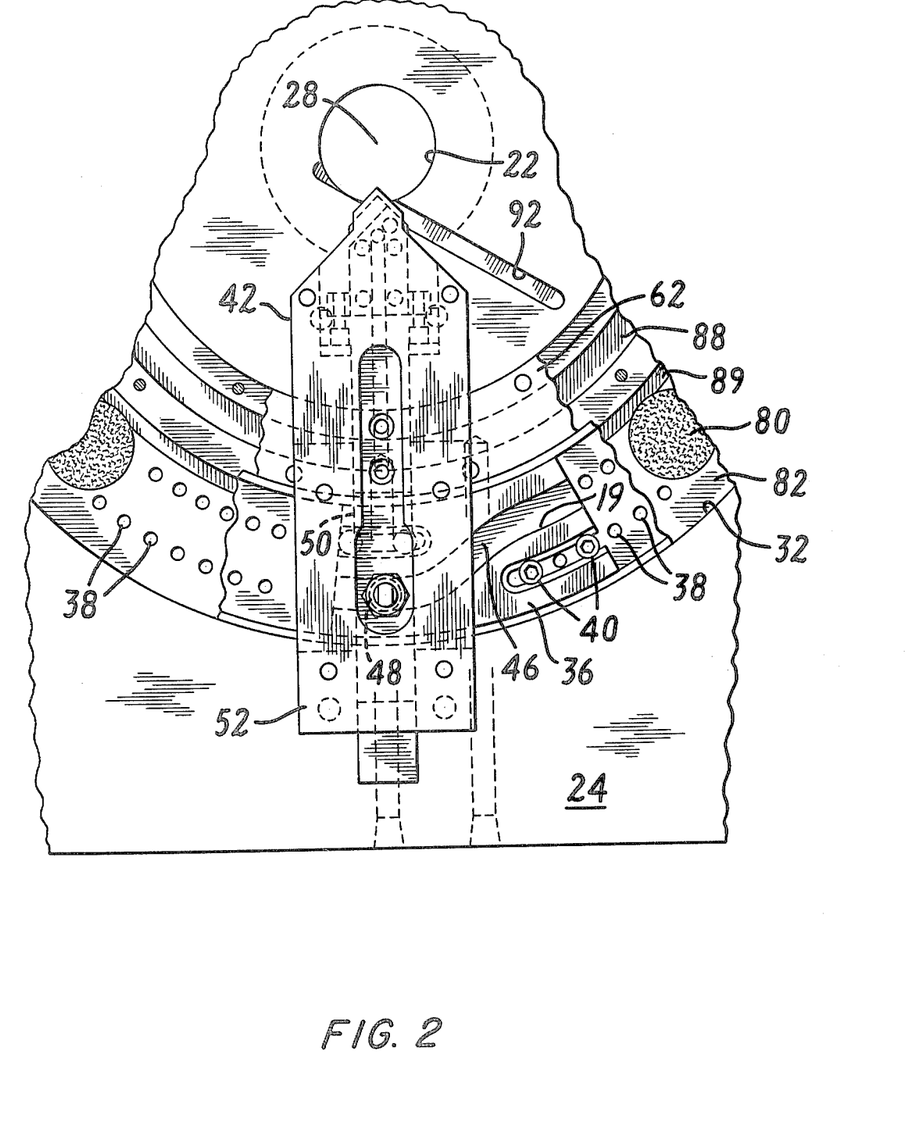
FIG. 2 is a fragmentary elevational view on enlarged scale of the lower part of the apparatus shown in FIG. 1, certain parts being shown removed for purposes of clarity, and the lower die member shown being in its open position.
Figure 3:
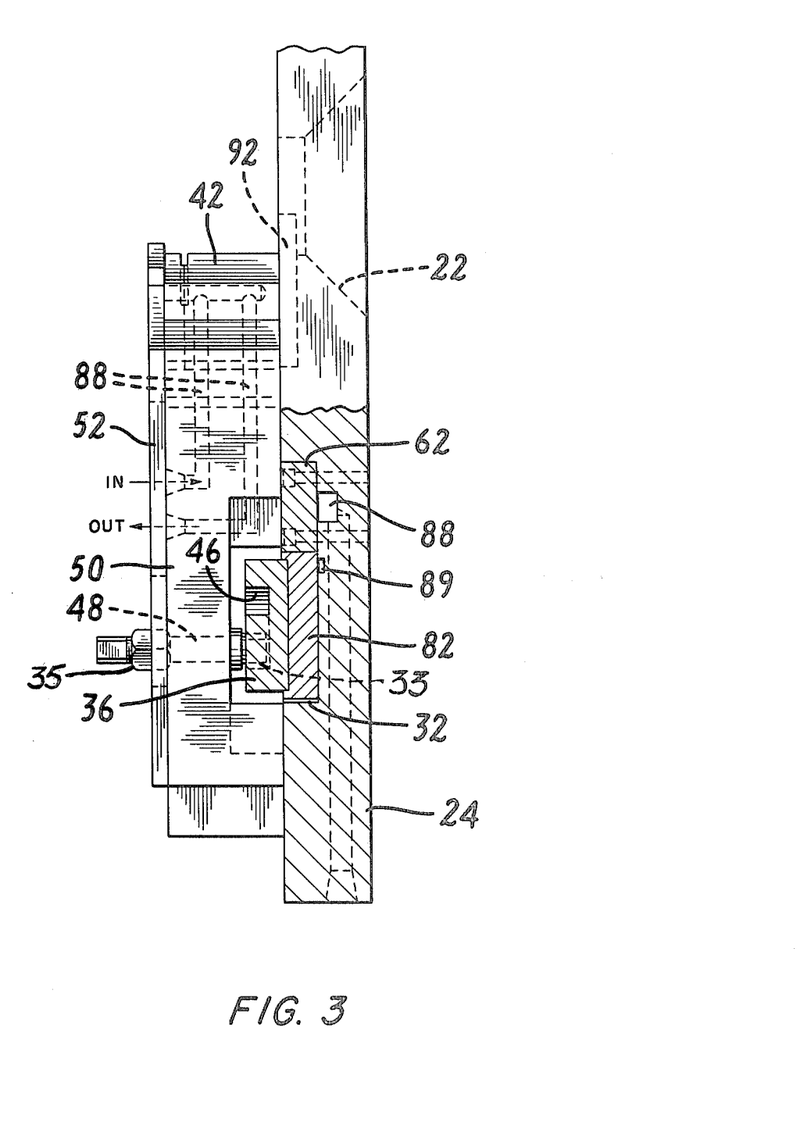
FIG. 3 is a vertical sectional view of the apparatus detail shown in FIG. 2, some parts being shown in full.

Turning now to the apparatus depicted in FIGS. 1-3 and with continuing reference to such figures, the mounting frame 24 serves as structure for receiving a ring member 30, the ring member being received in a suitable slotted race 32 formed in the frame and retained therein by means of segment blocks 27 and there being provided a peripheral space 25 to take up ring expansion, the arrangement being such that the ring member is free to rotate about central axis 28 and relative to the mounting frame. The ring member serves in turn as a mounting structure for receiving a plurality of camming blocks 36 and for which purpose the ring member is provided with a plurality of openings 38 by means of which the respective camming blocks can be adjustably mounted on the ring member with fastener bolts 40, the adjusted positions of the camming blocks, as those skilled in the art will readily apprehend, serving to control the sequence and timing of the opening and closing of the respective die and core members 42, 44. Each camming block 36 is provided with a camming surface 46, preferably in the form of a cam track and in which is received a cam follower 48 which is in turn mounted fixedly to a block member 50 there being one block member associated with each respective core and die member and the block members being supported beneath plate members 52 fixed to the mounting frame for sliding radial travel relatively of said fixed axis. FIG. 2 depicts the locked position of the cams, i.e., for example when the die members are moved to an open position, the cam track portion at 19 showing where the cams are locked with the die members in closed position. Both side faces of the cam track are milled to the axis 28 location and such distances from the faces to axis 28 represent the throws of the cams. Connected to the front end of each block member are the respective die members 42 and core members 44, the die and core members in this particular embodiment having the molding surface configurations shown in FIGS. 5, 6 and 8 and being used for the casting as an assembled unit the shaped article 60 shown in FIG. 7 which is the slider body and connected pull chain of a slide fastener component.

The ring member 30 rides on an inner ring member 62 which is fixed to the mounting frame and which is made of a softer metal than that of the outer ring member 30, as is customary with bearing surfaces, e.g., being of brass or bronze.

In order to effect opening and closing of the die and core members 42 and 44 upon effecting relative rotational movement between the ring member 30 and the frame member 24, the outer ring member 30 is provided with a lever arm 66 which extends radially outwardly therefrom and which is pivoted to the end of the piston rod 72 of an air or like fluid actuated cylinder unit 70, the air cylinder unit operating to oscillate the outer ring about the fixed central axis, the oscillating movement in turn causing the camming blocks to oscillate and hence impart sliding travel to the block members and die and core members radially of the fixed axis 28. During each cycle of operation, the core and die members are moved between their respective open and closed positions, the closed position of such components being shown in FIG. 1 and the open positions thereof being shown generally in FIG. 2 in respect of the bottom die member 42. It will be understood that the remaining core and die members occupy approximate positions when they are opened as that shown in FIG. 2.

For the purposes of effecting particular sequence and timing of the opening and closing of the core and die members, the camming blocks are suitably arranged in circular positioning around the ring member 30. If it is desired to have a faster and longer stroke of a particular component, such as would be the case where the core members are to move faster and through grater distances than the die members, the camming block tracks 46 therefor are made steeper than those associated with the movement of the die members and which feature is believed evident from FIG. 1. Further, the lower end of each cam follower 48 is provided as an eccentric 33 which is employed for setting up each core and die and for making adjustments to establish exact movement of the cores and dies between open and closed positions. As will be understood the apparatus will be set up to position each die 42 and core 44 in closed position, i.e., they meet at axis 28. However, this does not mean that perfect interfitting of this element is automatically thereby achieved. Adjustments have to be made with these elements to provide that in operation the dies and cores close to establish a tight mold with attendant smooth interfacing of companion surfaces of the respective die and core members. With the core and die members in proper interfitting relationship, the cam followers 48 can be rotated to place the eccentric 33 in proper contact with the camming surfaces of track 46 and then is locked in such position by means of locking nut 35. Thus the throw of each cam thereafter will be exactly as required to insure that the cores and dies move to a closed position which produces a tight mold.

As can readily be seen in FIG. 2, suitable lubrication application means such as oil wicks 80 and oil supply passages (89, FIG. 3) communicating therewith, can be provided for outlet at the face 82 of the race 32 in which the ring member 30 rotates. Moreover, and as shown at FIG. 3 for the purposes of effecting cooling of both the outer and inner ring members as well as the blocks 50 and cam and die members 42, 42, cooling passages 88 are also provided to permit flowing a cooling fluid in a flow contact course with these structures, conveyance of the cooling fluid to and from such passages being by means of hose components (not shown).

To facilitate removal of a shaped article from the cavity or molding surfaces formed by the respective dies and cores, a stripper member can be provided on one of the core members as at 90.

Additionally, an air channel 92 (FIG. 2) can be provided to direct a blast of air against the shaped article following the formation of same to further facilitate its removal from the apparatus, the air blast outletting against the article in a direction toward the viewer.

Figure 5:
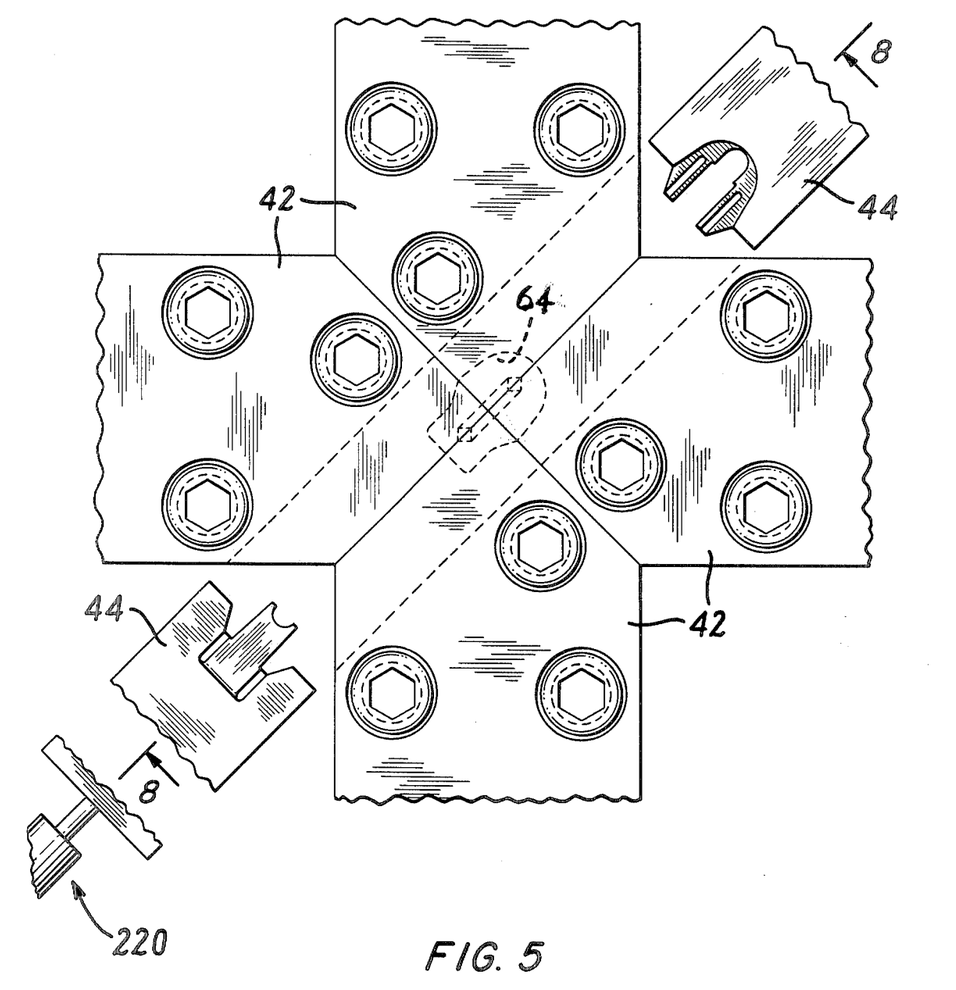
FIG. 5 is a fragmentary enlarged view in elevation of the die members of the apparatus in closed or casting position, the core members being shown in open position in full lines with their travel course to closed position being depicted by means of dash lines.
Figure 6:
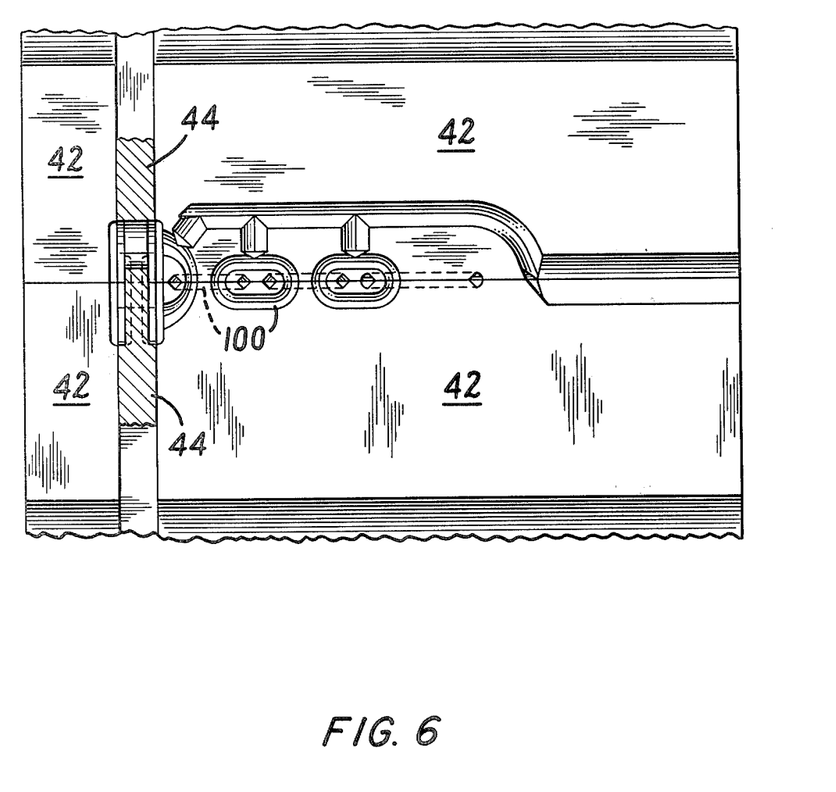
FIG. 6 is a vertical sectional view taken along the line 8—8 in FIG. 5 with the core members in closed position.
Figure 7:
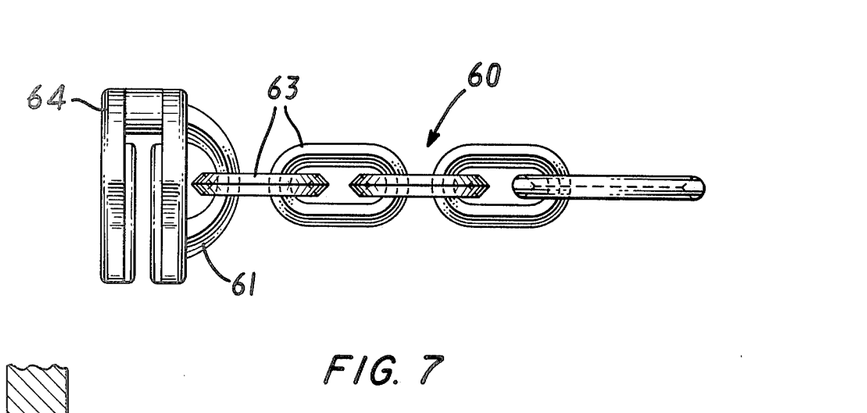
FIG. 7 shows one form of article which can be produced with the apparatus of the present invention, namely, a slider and chain assembly cast as an integral connected unit, and which is formed with the die and core members shown in FIGS. 5 and 6.
Figure 8:
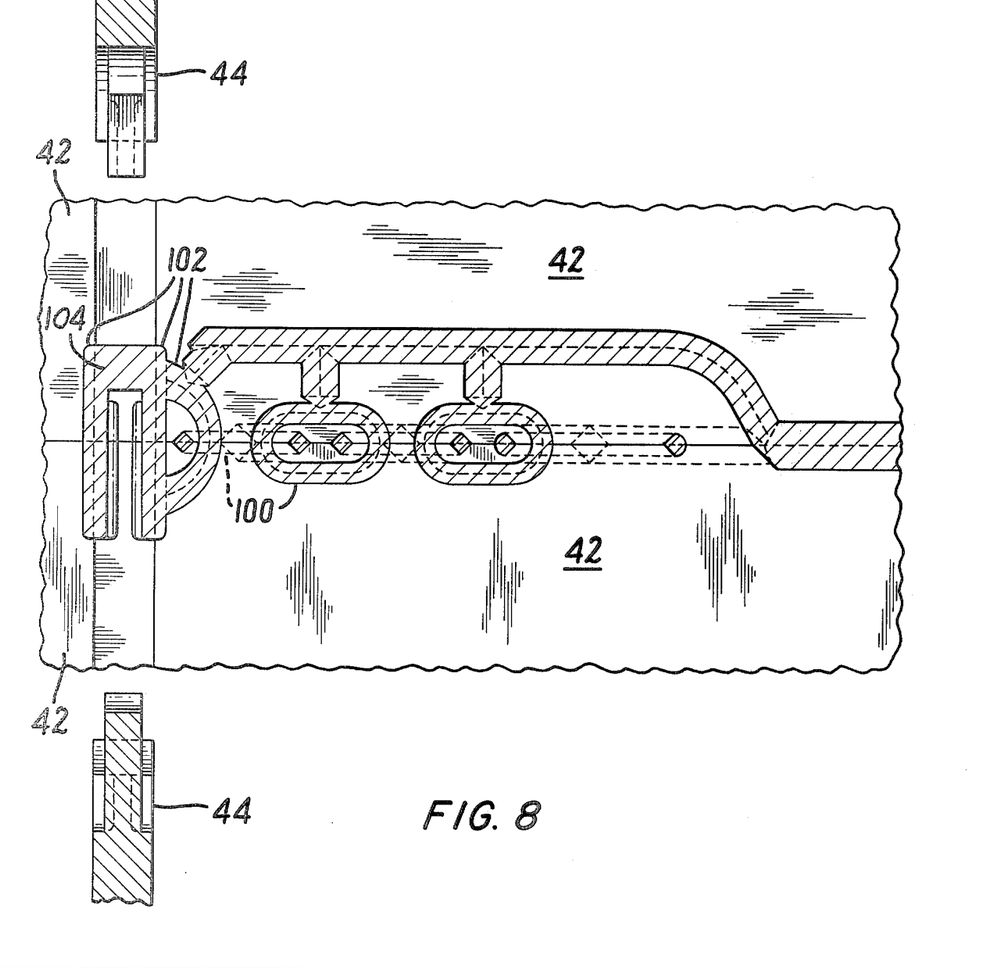
FIG. 8 is a view similar to FIG. 6 showing the manner in which the metal flow passages and sprues are formed in the respective die members, the cores being in open or retracted position.

FIGS. 5–8 are depictions made in respect of one form of shaped article 60 produced with the apparatus of the present invention which is, as indicated and best seen in FIG. 7, a slide fastener slider body 61 with interconnected chain member 63, the chain member being comprised of a plurality of separate links. The respective die members include groove surfaces 100 which define portions of the links and portions 102 of the slider body, one-half of each link and portions of the slider body being formed by one opposed pair of the die members, e.g., the top and right dies in FIG. 5 and the other half of each link and portion of the slider body being formed by the bottom and left die members pair, whereas, the core members 44 produce the central portion 104 of the slider body structure, the last-mentioned feature being particularly apparent from FIG. 8.

Figure 9:
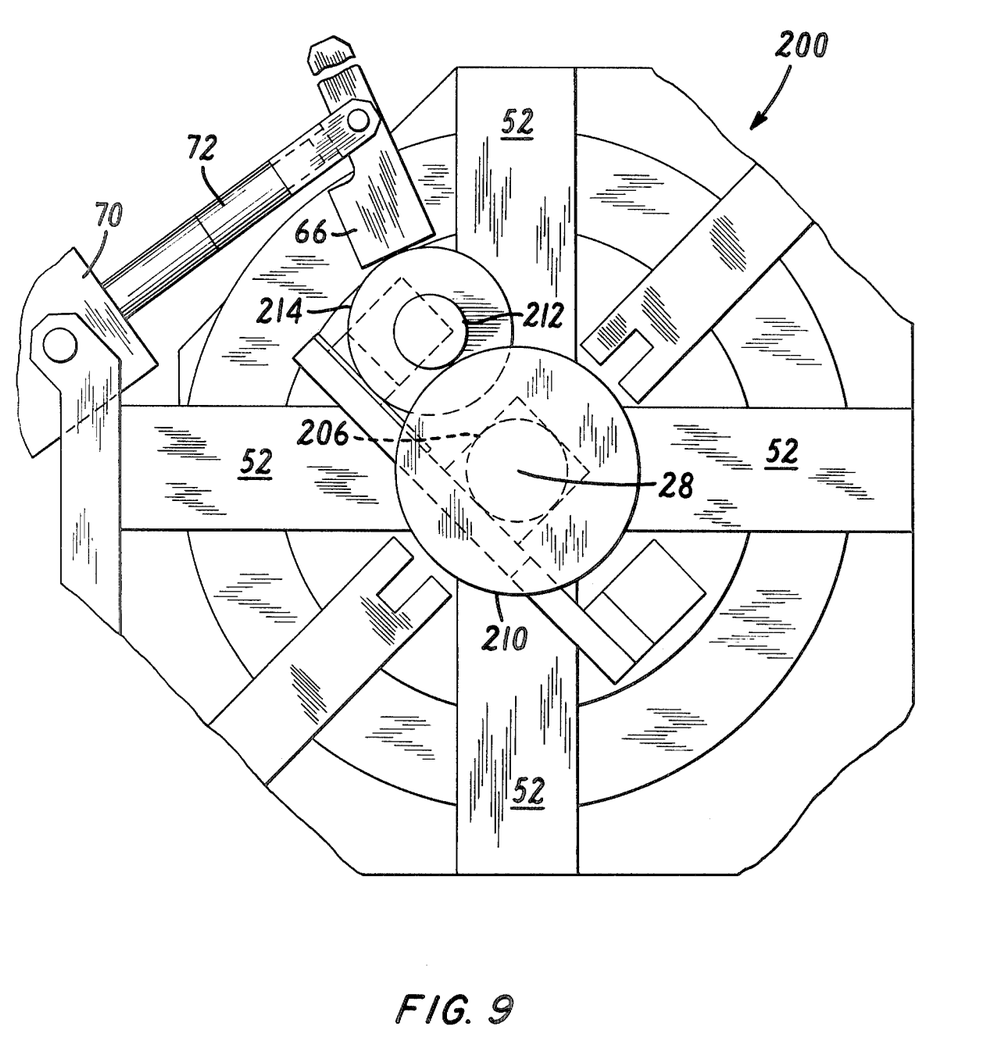
FIG. 9 is an elevational view showing the apparatus of the present invention when used for casting an article having an internally threaded passage therein or externally threaded surface thereon and including the use of a core member which moves slidably along the fixed axis and also rotates about said axis, the movement of such further core member being effected by an air cylinder unit and a drive motor for rotating the core member during retraction of same from its closed position.
Figure 10:
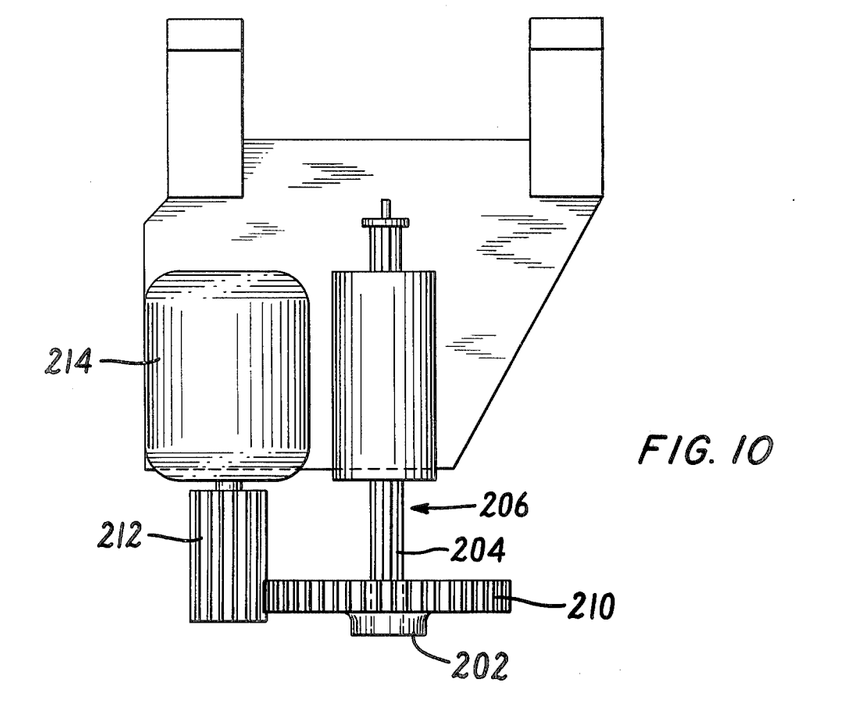
FIG. 10 is a side elevational view of the apparatus shown in FIG. 9.

In another embodiment 200 of the invention as shown in FIGS. 9 and 10, a further core member 202 can be employed for the purposes of casting an intricate shaped article, such as one having an internally threaded passage therein, or one having an externally threaded surface. In this arrangement, the apparatus is the same as that previously described except that the further core member is mounted on the end of the piston rod 204 of an air cylinder unit 206 which strokes the core or die member coaxially with the fixed axis 28 between open and closed positions, in the closed position, the core cooperating with the dies 42 and other core members 44 to define a threaded passageway or surface in the mold at the molding station. There is also mounted rotatably on the piston rod 204 but fixed longitudinaly thereof, a spur gear 210 to which the core or die member 202 is fixed and which is in mesh with a driver gear 212 which in turn is connected to an electric motor 214. During the movement of the further core member 202 between its closed and open positions, not only does gear 210 rotate under the driving force of gear 212, but it also slides along the teeth of the driver gear to maintain it in mesh therewith during its combined rotation and sliding travel. The gear 210 does not have to be rotated during movement of the core or die member to closed position and motor 214 need not be energized as it is only after the article has been cast and the core removed therefrom that the core member must be both slid and rotated. This last-mentioned embodiment is particularly useful for manufacturing shaped articles such as threaded electric components with an intermediate subcomponent having a threaded internal or external surface. In such arrangement it will be understood that the core member in order to be removed from the article following molding must be both slid and rotated from its position at the molding station. Further, the mode of effecting core movement as shown in FIGS. 9 and 10 could also be employed with others of the cores if the shape of the article being formed required such feature.

In accordance with the invention it is not necessary that both the die and core members be moved between open and closed position by means of the camming block arrangement shown in FIGS. 1–3. In certain applications it would be sufficient and desirable to operate the die members in this fashion, but as is shown in FIG. 5, it is also possible to move either one or both of the lower and upper core members between open and closed positions with an air cylinder unit 220.

Figure 11:
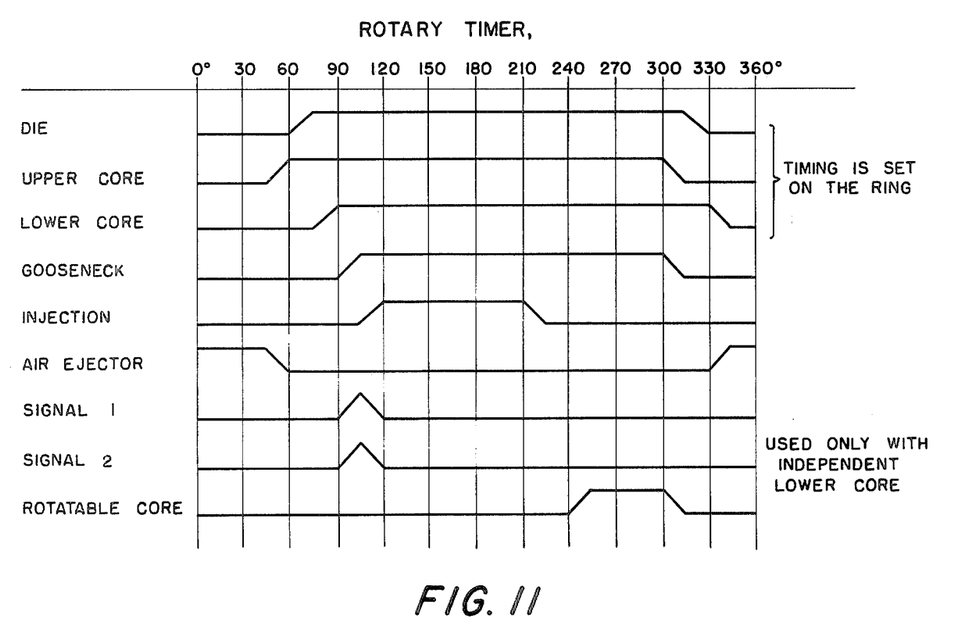
FIG. 11 is a timing diagram of the operation of the apparatus of the present invention.

FIG. 11 shows a timing diagram illustrating the sequence and times of movements of the various components of the apparatus as well as the times at which molten metal injection, removal air blast, etc. operations are carried out for each molding cycle, the diagram being for one complete rotation of a rotary timer unit.

The apparatus of the present invention also includes a safety feature which insures that during the intended molding cycle, no injection of molten metal will occur from the gooseneck to the die and core members unless such members are in fully closed position. For example, if a metal residue of a prior casting cycle is stuck to one of the die members 42 so as to prevent complete closure of the assembly, the casting cycle should be stopped to prevent delivery of molten metal to the casting station. As seen in FIG. 1, an electrical signal is fed into a control unit 300, such signal being associated with maintenance of operation of the apparatus including molten metal supply. A normally open microswitch 302 is disposed to lie in the path of the lever 66 and to be actuated to closed position by same when ring 30 is oscillated to move the die members 42 to closed position and thus pass the signal through the control unit 300. If the die members do not close fully, switch 302 will not close and pass the signal through that switch to the control unit. As a consequence, the control unit 300 will function to turn off all power to the apparatus.

It will be apparent from the foregoing that the present invention is a significant development in apparatus with which shaped articles can be injection molded, and particularly articles which include two or more subcomponents joined together in interconnected assembly. It will be apparent further than certain modifications can be made in the apparatus within the scope of the inventive concept herein disclosed. For example, and with reference to FIG. 8, it wil be understood that a second core set and suitable modification in the die members shown therein could be made so as to cast two complete slider body and connected chain assemblies in a single injection operation, the chain assembly, for example, being disposed at the left side of the dies depicted.

What is claimed is:

1. Apparatus for die casting shaped articles comprising
   a molten metal supply means provided with an outlet for feeding metal from said supply means to a mold,
   a mounting frame disposed adjacent said outlet, said molten metal supply means being movable toward and away from said mounting frame,
   a ring member carried rotatably in said mounting frame for rotation about a fixed axis,
   a plurality of die members and a plurality of core members mounted on said frame for sliding movement radially of said fixed axis between open and closed positions, said die members and said core members being provided with complementary configured surfaces which define said mold when said members are closed corresponding to the shape of the article to be cast,
   means associated with said die members for sliding said die members between their open and closed positions, such means including camming blocks carried on said ring member and having camming surfaces thereon, and cam followers connected with said die members, said cam followers engaging said camming surfaces to effect sliding movement of said die members responsive to relative rotation between said mounting frame and said ring member, and
   means associated with said core members for sliding said core members between their open and closed positions, the sliding means associated with at least one of said core members including a camming block carried on said ring member and having a camming surface thereon, and a cam follower connected with said one core member, said cam follower engaging said camming surface to effect sliding movement of said one core member responsive to relative rotation between said mounting frame and said ring member,
   said ring member being provided with a plurality of openings therethrough, said openings extending in encircling courses about said ring member, said camming blocks being secured to said ring member with fasteners received in said openings, the positioning of said camming blocks on said ring member relative to the others being selectively changeable by receiving said fasteners in selected ones of said openings thereby to control the timing sequence with which said die members and any core members slid by oscillation of said ring member open and close during each oscillation of said ring member,
   the mold surfaces of said die members and core members communicating with said molten metal supply means when said die members and core members are in closed position and said molten metal supply means is moved toward said mounting frame to bring the outlet therefrom into engagement with said mold.

2. The apparatus of claim 1 in which the core sliding means comprises a fluid actuated cylinder unit connected to at least one of the core members in said plurality of core members, said cylinder unit having a piston rod fixed to said one core member.

3. The apparatus of claim 1 in which the camming surfaces on said camming blocks are cam tracks, the cam followers being received in said tracks.

4. The apparatus of claim 1 in which said camming blocks are provided one in correspondence to each die member and with each core member which is slid by oscillation of said ring member, said camming blocks being circularly spaced on said ring member.

5. The apparatus of claim 1 in which said molten metal supply means includes a pool of molten metal, and a supply conduit connecting said supply outlet with said pool.

6. The apparatus of claim 1 further comprising stripper means carried on one of said core members for stripping the shaped article from the mold defining surfaces when said die member and said members are moved from closed to open position.

7. The apparatus of claim 1 in which said shaped article is a slide fastener slider and a chain length connected with said slider, said die members being configured to mold said chain length and a portion of said slider, said core members being configured to mold the remainder portion of said slider.

8. The apparatus of claim 1 in which the die member comprises four in number spaced substantially 90° one from the other about said fixed axis, the core member comprising two in number intervening adjacent die members at diametrically opposed locations relative to said fixed axis.

9. The apparatus of claim 1 further comprising means for oscillating said ring member about said fixed axis to effect cyclic opening and closing of said die members.

10. The apparatus of claim 9 in which said oscillating means comprises a fluid actuated cylinder unit, said cylinder unit having a piston rod fixed to said ring member, stroking movement of said piston rod oscillating said ring member.

11. The apparatus of claim 10 in which the ring member is provided with a lever arm extending radially outwardly therefrom, said piston rod being pivoted to said lever arm.

12. The apparatus of claim 11 in further comprising a microswitch disposed for engagement with the path of movement of said lever arm and in circuit with means for controlling operation of said apparatus, said microswitch being effective to deenergize operation of said apparatus if said die members fail to move to fully closed position during the casting cycle.

13. The apparatus of claim 1 in which said shaped article is one having a threaded surface in its structure, and said apparatus includes a further core member movable along said axis from open and closed positions to define with said die members and core members a thread forming mold surface.

14. The apparatus of claim 13 in which the said further core member is carried on the piston rod of a fluid actuated cylinder unit for moving said further core member between open and closed positions, there being means for concurrently rotating said further core member about said fixed axis during its movement between its open and closed positions.

15. The apparatus of claim 14 in which said rotating means includes a driven gear rotatable on said piston rod but fixed longitudinally thereof and continuously in mesh with a driver gear during the movement of said further core member along said fixed axis.

16. In apparatus for die casting shaped articles which includes
a molten metal supply means provided with an outlet for feeding metal from said supply means to a mold,
a mounting frame disposed adjacent said outlet said molten metal supply means being movable toward and away from said mounting frame,
a ring member carried rotatably in said mounting frame for rotation about a fixed axis,
a plurality of die members mounted on said frame for sliding movement radially of said fixed axis between open and closed positions, said die members being provided with complementary configured surfaces which define said mold when said members are closed corresponding to the shape of the article to be cast and
means associated with said die members for sliding said die members between their open and closed positions, such means including camming blocks carried on said ring member and having camming surface thereon, and cam followers connected with said die members, said cam followers engaging said camming surfaces to effect sliding movement of said die members responsive to relative rotation between said mounting frame and said ring member,
said ring member being provided with a plurality of openings therethrough, said openings extending in encircling courses about said ring member, said camming blocks being secured to said ring member with fasteners received in said openings, the positioning of said camming blocks on said ring member relative to the others being selectively changeable by receiving said fasteners in selected ones of said openings thereby to control the timing sequence with which said die members open and close during each oscillation of said ring member,
the mold surfaces of said die members communicating with said molten metal supply means when said die members are in closed position and said molten metal supply means is moved toward side mounting frame to bring the outlet therefrom into engagement with said mold.

17. The apparatus of claim 16 further comprising means for oscillating said ring member about said fixed axis to effect cyclic opening and closing of said die members.

18. The apparatus of claim 16 in which the camming surfaces on said camming blocks are cam tracks, the cam followers being received in said tracks.

19. Apparatus for die casting shaped articles comprising:
a molten metal supply means provided with an outlet for feeding metal from said supply means to a mold,
a mounting frame disposed adjacent said outlet, said molten metal supply means being movable toward and away from said mounting frame,
a ring member carried rotatably in said mounting frame for rotation about a fixed axis,
a plurality of die members and a plurality of core members mounted on said frame for sliding movement radially of said fixed axis between open and closed positions, said die members and said core members being provided with complementary configured surfaces which define said mold when said members are closed corresponding to the shape of the article to be cast,
means associated with said die members for sliding said die members between their open and closed positions, such means including camming blocks carried on said ring member and having camming surfaces thereon, and cam followers connected with said die members, said cam followers engaging said camming surfaces to effect sliding movement of said die members responsive to relative rotation between said mounting frame and said ring member, means associated with said core members for sliding said core members between their open and closed positions, the sliding means associated with at least one of said core members including a camming block carried on said ring member and having a camming surface thereon, and a cam follower connected with said one core member, said cam follower engaging said camming surface to effect sliding movement of said one core member responsive to relative rotation between said mounting frame and said ring member, and a second ring member fixed in said mounting frame radially inwardly relatively of said first-mentioned ring member, said second ring member being in edge-to-edge adjacency with said first ring member whereby it serves as a bearing on which said first ring member rotates, the mold surfaces of said die members and core members communicating with said molten metal supply means when said die members and core members are in closed position and said molten metal supply means is moved toward said mounting frame to bring the outlet therefrom into engagement with said mold.

20. The apparatus of claim 19 in which said first ring member is a metallic component, the second ring member being of a metallic component which is softer than that of said first ring member.

21. The apparatus of claim 19 in which said mounting frame is provided with passages communicating with at least said second ring member for supplying cooling medium in a contact flow course with said second ring member.

22. Apparatus for die casting shaped articles comprising:

a molten metal supply means provided with an outlet for feeding metal from said supply means to a mold, a mounting frame disposed adjacent said outlet, said molten metal supply means being movable toward and away from said mounting frame, a ring member carried rotatably in said mounting frame for rotation about a fixed axis, a plurality of die members and a plurality of core members mounted on said frame for sliding movement radially of said fixed axis between open and closed positions, said die members and said core members being provided with complementary configured surfaces which define said mold when said members are closed corresponding to the shape of the article to be cast, means associated with said die members for sliding said die members between their open and closed positions, such means including camming blocks carried on said ring member and having camming surfaces thereon, and cam followers connected with said die members, said cam followers engaging said camming surfaces to effect sliding movement of said die members responsive to relative rotation between said mounting frame and said ring member, means associated with said core members for sliding said core members between their open and closed positions, the sliding means associated with at least one of said core members including a camming block carried on said ring member and having a camming surface thereon, and a cam follower connected with said one core member, said cam follower engaging said camming surface to effect sliding movement of said one core member responsive to relative rotation between said mounting frame and said ring member, and a push block fixed to each die member and to said one core member, the respective cam followers being rotatably adjustably fixed to the push blocks, the mold surfaces of said die members and core members communicating with said molten metal supply means when said die members and core members are in closed position and said molten metal supply means is moved toward said mounting frame to bring the outlet therefrom into engagement with said mold.

23. The apparatus of claim 22 in which each die and core member and its respective push block are provided with passages for supplying cooling medium in a contact flow course with such die and core members and blocks.

24. The apparatus of claim 22 further comprising air flow passage means extending through said die members and core members and through said mounting frame through which a flow of pressurized air can be passed to facilitate removal of a shaped article from the mold defining surfaces.

25. Apparatus for die casting a slide fastener slider and chain length of plural links connected with said slider, said apparatus comprising:

a molten metal supply means provided with an outlet for feeding metal from said supply means to a mold, a mounting frame disposed adjacent said outlet, said molten metal supply means being movable toward and away from said mounting frame, a ring member carried rotatably in said mounting frame for rotation about a fixed axis, four die members and a pair of core members mounted on said frame for sliding movement radially of said fixed axis between open and closed positions, the die members being circularly spaced from one another about said axis and the core members intervening opposed pairs of said die members, said die members and said core members being provided with complementary configured surfaces which define said mold when said members are closed corresponding to the shape of the article to be cast, the die and core members being configured such that one-half of each link in the chain and a first part of the sliders are formed by one pair of die members and the other half of each link and a second part of the slider are formed by the other pair of die members, a third remainder part of said slider being formed by said core members, means associated with said die members for sliding said die members between their open and closed positions, such means including camming blocks carried on said ring member and having camming surfaces thereon, and cam followers connected with said die members, said cam followers engaging said camming surfaces to effect sliding movement of said die members responsive to relative rotation between said mounting frame and said ring member, and means associated with said core members for sliding said core members between their open and closed positions, the sliding means associated with at least one of said core members including a camming block carried on said ring member and having a camming surface thereon, and a cam follower connected with said one core member, said cam follower engaging said camming surface to effect sliding movement of said one core member responsive to relative rotation between said mounting frame and said ring member, said ring member being provided with a plurality of openings therethrough, said openings extending in encircling courses about said ring member, said camming blocks being secured to said ring member with fasteners received in said openings, the positioning of said camming blocks on said ring member relative to the others being selectively changeable by receiving said fasteners in selected ones of said openings thereby to control the timing sequence with which said die members and any core members slid by oscillation of said ring member open and close during each oscillation of said ring member, the mold surfaces of said die members and core members communicating with said molten metal supply means when said die members and core members are in closed position and said molten metal supply means is moved toward said mounting frame to bring the outlet therefrom into engagement with said mold.

26. Apparatus for die casting shaped articles comprising:

a molten metal supply means provided with an outlet for feeding metal from said supply means to a mold, a mounting frame disposed adjacent said outlet, said molten metal supply means being movable toward and away from said mounting frame, a ring member slidably rotatably carried in a circular track in said mounting frame for rotation about a fixed axis, said circular track being provided with lubrication application means including a lubricant supply channel outletting at the face of said track and a wicking member at said channel outlet and in contact with the face of said ring member which slides on said track face, a plurality of die members and a plurality of core members mounted on said frame for sliding movement radially of said fixed axis between open and closed positions, said die members and said core members being provided with complementary configured surfaces which define said mold when said members are closed corresponding to the shape of the article to be cast, means associated with said die members for sliding said die members between their open and closed positions, such means including cooperating structure carried on said ring member and on each of said die members to effect sliding movement of said die member responsive to relative rotation between said mounting frame and said ring member, and means associated with said core members for sliding said core members between their open and closed positions, the mold surfaces of said die members and core members communicating with said molten metal supply means when said die members and core members are in closed position and said molten metal supply means is moved toward said mounting frame to bring the outlet therefrom into engagement with said mold.

* * * * *